US011432197B1

(12) United States Patent
Marupaduga

(10) Patent No.: US 11,432,197 B1
(45) Date of Patent: Aug. 30, 2022

(54) PRESERVING MOBILE BACKHAUL BANDWIDTH IN CONCURRENT MODE

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 4 days.

(21) Appl. No.: 16/867,021

(22) Filed: May 5, 2020

(51) Int. Cl.
| | |
|---|---|
| *H04W 28/08* | (2009.01) |
| *H04W 28/16* | (2009.01) |
| *H04W 88/10* | (2009.01) |
| *H04W 16/28* | (2009.01) |
| *H04W 24/04* | (2009.01) |
| *H04L 43/16* | (2022.01) |
| *H04L 43/0882* | (2022.01) |
| *H04W 84/04* | (2009.01) |
| *H04W 24/08* | (2009.01) |

(52) U.S. Cl.
CPC ......... *H04W 28/16* (2013.01); *H04L 43/0882* (2013.01); *H04L 43/16* (2013.01); *H04W 16/28* (2013.01); *H04W 24/04* (2013.01); *H04W 28/0942* (2020.05); *H04W 88/10* (2013.01); *H04W 24/08* (2013.01); *H04W 84/042* (2013.01)

(58) Field of Classification Search
CPC .. H04W 8/18; H04W 16/28; H04W 88/08–18
See application file for complete search history.

(56) References Cited

U.S. PATENT DOCUMENTS

| | | | |
|---|---|---|---|
| 9,853,699 B2 | 12/2017 | Jalloul et al. | |
| 2013/0100897 A1* | 4/2013 | Negus | H01Q 21/24 370/329 |
| 2015/0110049 A1* | 4/2015 | Pabla | H04B 7/0691 370/329 |
| 2016/0094286 A1* | 3/2016 | Maltsev | H04W 92/045 370/329 |
| 2016/0308589 A1* | 10/2016 | Jalloul | H04L 25/0228 |
| 2018/0054241 A1* | 2/2018 | Pi | H04B 7/0421 |
| 2018/0176920 A1* | 6/2018 | Dong | H04W 16/28 |
| 2021/0159946 A1* | 5/2021 | Raghavan | H04B 7/0874 |

FOREIGN PATENT DOCUMENTS

WO    2016/155532 A1    10/2016

* cited by examiner

*Primary Examiner* — San Htun

(57) ABSTRACT

Preserving a bandwidth of a mobile backhaul by reducing a quantity of antenna elements that can concurrently deploy two or more radio air interfaces including 4G LTE and 5G NR. The reduction of antenna elements using concurrent mode may be performed incrementally, based on the backhaul bandwidth usage meeting different predefined thresholds.

16 Claims, 5 Drawing Sheets

PRESERVING MOBILE BACKHAUL BANDWIDTH IN CONCURRENT MODE

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Radio access technologies (RATs) such as 5G New Radio (NR) are being implemented alongside existing RATs such as 3G and 4G Long Term Evolution (LTE), and wireless devices are increasingly becoming more capable of connecting to these RATs. Further, access nodes are being deployed with increased numbers of transmit antennae, which can be used to deploy multiple input multiple output (MIMO) streams. Such an access node can also be configured to use "concurrent mode", in which a single antenna element can be used to transmit both 4G LTE and 5G NR signals.

Increasing numbers of 5G NR wireless devices can cause increased load on wireless networks. This is because 5G is capable of deploying various different bandwidths, most of which are higher than 4G bandwidths. Thus, 5G NR wireless devices can be used for more resource-intensive applications, such as live-streaming video, gaming, etc. 5G NR wireless devices that are MIMO capable can result in large amount of data being transmitted through various components of a wireless network. For example, a mobile backhaul connection between a radio access network (including access nodes, cell site routers, etc.) and a core network (including mobility management entities, serving gateways, etc.) can get overwhelmed when large numbers of 5G capable wireless devices are using radio air interface resources of the access nodes. Thus, there is a need to preserve the bandwidth of a mobile backhaul particularly when load is high.

OVERVIEW

Exemplary embodiments described herein include methods, systems, and processing nodes for preserving a bandwidth of a mobile backhaul. An exemplary method for preserving a bandwidth of a mobile backhaul includes determining that a usage of a mobile backhaul connection associated with the access node exceeds a threshold, and configuring a portion of the plurality of antenna elements to deploy one less wireless air interface.

An exemplary system for preserving a bandwidth of a mobile backhaul includes an access node comprising a plurality of antenna elements, each antenna element being configured to deploy at least two wireless air interfaces, and a processing node communicably coupled to the access node, the processing node configured to perform operations including determining that a usage of a mobile backhaul connection associated with the access node exceeds a threshold, and configuring a portion of the plurality of antenna elements to deploy one less wireless air interface.

An exemplary processing node for preserving a bandwidth of a mobile backhaul is configured to perform operations including determining that a usage of a mobile backhaul connection associated with the access node exceeds a threshold, and configuring a portion of the plurality of antenna elements to deploy one less wireless air interface.

DETAILED DESCRIPTION

Figure 1:
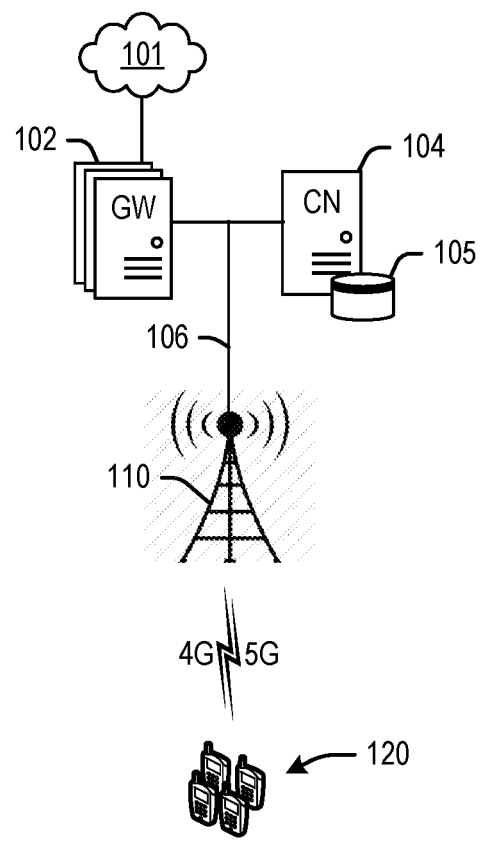
FIG. 1 depicts an exemplary system for preserving a bandwidth of a mobile backhaul.

The following disclosure provides methods and systems for preserving a bandwidth of a mobile backhaul by reducing a quantity of antenna elements that can deploy two or more radio air interfaces. The antenna elements can include transmit antennae. For example, in a heavily loaded 5G network with 64 transmit antenna elements, when the backhaul bandwidth meets a threshold, the quantity of transmit antenna elements operating in concurrent mode (e.g. deploying 4G LTE and 5G NR) can be reduced to 32. In other words, only 32 transmit antenna elements would continue operating in concurrent mode, while the remaining 32 antenna elements would deploy only the 4G LTE air interface. The reduction of antenna elements using concurrent mode may be performed incrementally, based on the backhaul bandwidth usage meeting different predefined thresholds.

Exemplary access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in a "concurrent mode", individual antenna elements can be configured to simultaneously deploy at least two different air interfaces.

Therefore, as described herein, an access node (or a processing node communicably coupled thereto) is configured to perform operations comprising monitoring a usage of a mobile backhaul link and, based on the usage of the mobile backhaul link, adjusting a quantity of antenna elements that are configured to concurrently deploy at least two wireless air interfaces. Upon determining that the usage of the mobile backhaul link exceeds a threshold, the quantity of antenna elements that are configured to deploy the at least two wireless air interfaces is reduced. Correspondingly, and upon determining that the usage drops below a threshold, the quantity of antenna elements that are configured to deploy the at least two wireless air interfaces can be increased. Further, the threshold can include one of a plurality of thresholds, and the quantity of antenna elements may be incrementally reduced as the usage of the mobile backhaul link rises to meet each of the plurality of thresholds. In an exemplary embodiment, reducing the quantity of antenna elements comprises configuring a portion of the plurality of antenna elements to deploy only one wireless air interface instead of two wireless air interfaces. For example, when the at least two wireless air interfaces comprise a 4G long-term evolution (LTE) wireless air interface and a 5G new radio (NR) wireless air interface, the portion of the plurality of antenna elements may be configured to deploy only the 4G wireless air interface. Optionally, a load of the 5G wireless air interface must meet a load threshold prior to performing any adjustment to the quantity of antenna elements.

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-6.

FIG. 1 depicts an exemplary system 100 comprising a communication network 101, gateway 102, controller node 104, access node 110, and wireless devices 120. In this exemplary embodiment, access node 110 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, access node 110 can be configured to communicate using both interfaces at the same time in what is referred to as "concurrent mode". For example, antenna elements coupled to access node 110 can be configured to simultaneously communicate using 4G LTE and 5G NR. In an exemplary embodiment, access node 110 is configured to utilize 5G EN-DC, dual connections are initiated with wireless devices 120 using both 4G and 5G carriers, the 4G carrier being used to transmit control information, and the 5G carrier being used to transmit data information. Various other combinations of carriers/wireless air interfaces, antenna elements, access nodes, and wireless devices may be evident to those having ordinary skill in the art in light of this disclosure.

Increasing numbers of 5G NR wireless devices among wireless devices 120 can cause increased load on various components of system 100, as described above. For example, a mobile backhaul connection 106 between a access node 110 and core network elements (including gateway node(s) 102 and controller node 104) can get overwhelmed when 5G NR usage of wireless devices 120 is high, since a bandwidth of mobile backhaul connection 106 may be limited to a maximum bandwidth. Thus access node 110 (or a processing node communicably coupled thereto) is configured to perform operations comprising monitoring a usage of a mobile backhaul link 106 and, based on the usage, adjusting a quantity of antenna elements of access node 110 that are configured to concurrently deploy the 4G LTE and 5G NR wireless air interfaces. Upon determining that the usage of the mobile backhaul link 106 exceeds a threshold, the quantity of antenna elements that are configured to concurrently deploy both wireless air interfaces is reduced. Correspondingly, and upon determining that the usage drops below a threshold, the quantity of antenna elements that are configured to deploy both wireless air interfaces can be increased. Further, the threshold can include one of a plurality of thresholds, and the quantity of antenna elements may be incrementally reduced as the usage of the mobile backhaul link 106 rises to meet each of the plurality of thresholds. In an exemplary embodiment, reducing the quantity of antenna elements comprises configuring a portion of the plurality of antenna elements to deploy only one wireless air interface instead of two wireless air interfaces. For example, the portion of the plurality of antenna elements may be configured to deploy only the 4G wireless air interface, as further illustrated in FIGS. 6A-6C. Optionally, a load of the 5G wireless air interface must meet a load threshold prior to performing any adjustment to the quantity of antenna elements.

Access node 110 can be any network node configured to provide communication between wireless devices 120 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via mobile backhaul link 106. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 120 may be any device, system, combination of devices, or other such communication platform capable of communicating wirelessly with access node 110 using one or more frequency bands deployed therefrom. Each of wireless devices 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 1200. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Mobile backhaul link 106 can use various communication media, such as air, space, metal, optical fiber, or some other signal propagation path—including combinations thereof. Mobile backhaul link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Mobile backhaul link 106 can be a direct link or might include various equipment, intermediate components, systems, and networks, such as a cell site router, etc. Mobile backhaul link 106 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information of access node 110, capabilities of wireless devices 120 and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or network 101.

Figure 2:
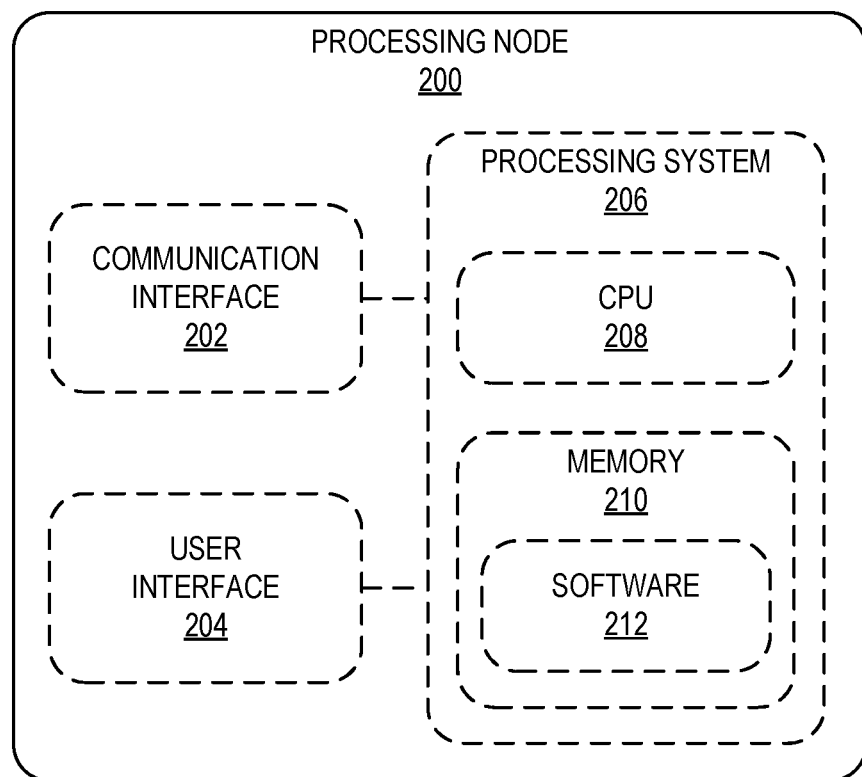
FIG. 2 depicts an exemplary processing node for preserving a bandwidth of a mobile backhaul.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for preserving a bandwidth of a mobile backhaul link of an access node by monitoring a usage of the mobile backhaul link and, based on the usage of the mobile backhaul link, adjusting a quantity of antenna elements that are configured to concurrently deploy at least two wireless air interfaces. In another exemplary embodiment, software 212 can include instructions for preserving a bandwidth of the mobile backhaul link by determining that a usage of a mobile backhaul connection associated with the access node exceeds a threshold, and configuring a portion of the plurality of antenna elements to deploy one less wireless air interface.

Figure 3:
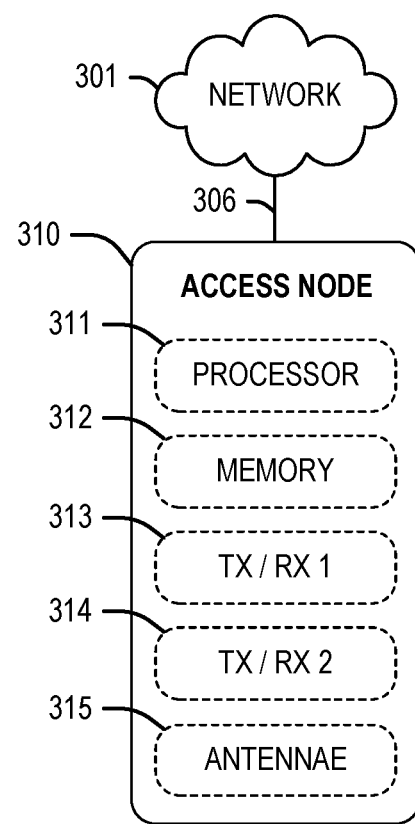
FIG. 3 depicts an exemplary access node for preserving a bandwidth of a mobile backhaul.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, first transceiver 313, second transceiver 314, and antennae 315 (hereinafter referred to as antenna elements 315). Processor 311 executes instructions stored on memory 312, and transceivers 313 and 314 (in conjunction with antenna elements 315) enable wireless communication respectively at least two wireless air interfaces, such as 4G LTE and 5G NR. For example, access node 310 may be configured to transmit control information using the 4G LTE transceiver 313 and data information using the 5G NR transceiver 314. Alternatively or in addition, each separate air interface maintains its own control and data transmissions. Further, antenna elements 315 may include an array of antenna elements that are configured to deploy air interfaces over one or more wireless sectors, form beams within these sectors, employ multiple-input-multiple-output (MIMO), etc.

Exemplary instructions stored on memory 312 can include instructions for preserving a bandwidth of a mobile backhaul link of access node 310 by monitoring a usage of the mobile backhaul link and, based on the usage of the mobile backhaul link, adjusting a quantity of antenna elements 315 that are configured to concurrently deploy at least two wireless air interfaces. In another exemplary embodiment, memory 312 can include instructions for preserving a bandwidth of the mobile backhaul link by determining that a usage of the mobile backhaul link associated with access node 310 exceeds a threshold, and configuring a portion of the plurality of antenna elements 315 to deploy one less wireless air interface.

Figure 4:
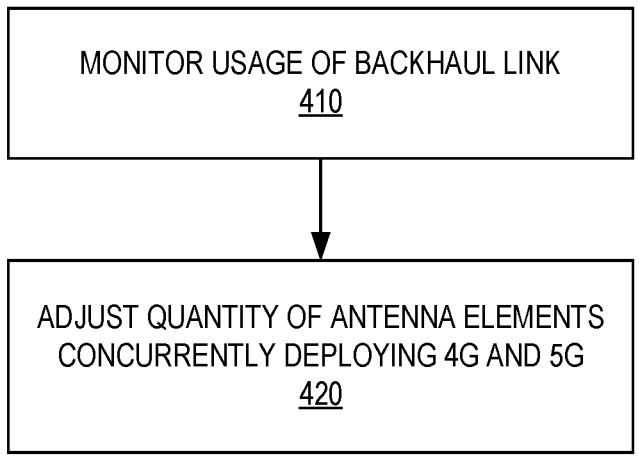
FIG. 4 depicts an exemplary method for preserving a bandwidth of a mobile backhaul.

FIG. 4 depicts an exemplary method for preserving a bandwidth of a mobile backhaul link. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a usage of a backhaul link is monitored and, at 420, a quantity antenna elements concurrently deploying 4G and 5G radio air interfaces is adjusted. The antenna elements may be coupled to an access node that, as described herein, can communicate over a plurality of wireless air interfaces. For example, the access node can include a combination of a 4G eNodeB and a 5G gNodeB. In other words, the access node can be configured to communicate using 4G LTE as well using 5G NR. Further, each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in a "concurrent mode", individual antenna elements can be configured to simultaneously deploy at least two different air interfaces. As described above, increasing numbers of 5G NR wireless devices attached to the access node can overwhelm the bandwidth of a mobile backhaul connection between the access node and core network elements.

Therefore, at 420, the quantity of antenna elements that are configured to deploy the at least two wireless air interfaces is reduced. Reducing the quantity of antenna elements comprises configuring a portion of the plurality of antenna elements to deploy only one wireless air interface instead of two wireless air interfaces. For example, when the at least two wireless air interfaces comprise a 4G long-term evolution (LTE) wireless air interface and a 5G new radio (NR) wireless air interface, the portion of the plurality of antenna elements may be configured to deploy only the 4G wireless air interface. Optionally, if a load is high at 420 of the 5G wireless air interface, the disclosed operations may be triggered.

Figure 5:
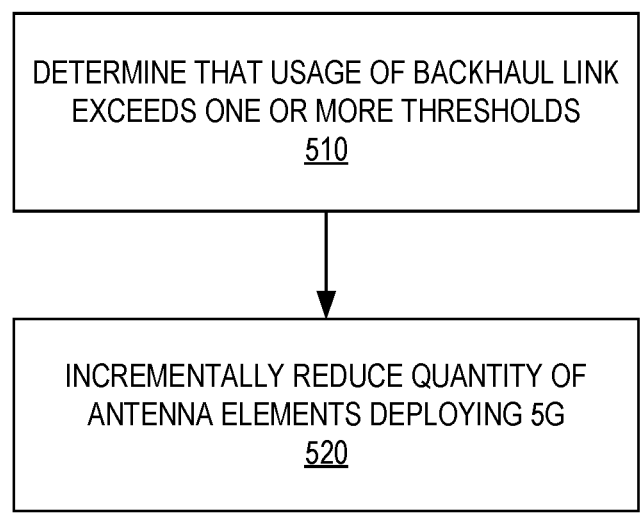
FIG. 5 depicts another exemplary method for preserving a bandwidth of a mobile backhaul.

FIG. 5 depicts another exemplary method for preserving a bandwidth of a mobile backhaul link. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that a usage of a backhaul link exceeds one or more thresholds. The antenna elements may be coupled to an access node that, as described herein, can communicate over a plurality of wireless air interfaces. For example, the access node can include a combination of a 4G eNodeB and a 5G gNodeB. In other words, the access node can be configured to communicate using 4G LTE as well using 5G NR. Further, each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users. Further, in a "concurrent mode", individual antenna elements can be configured to simultaneously deploy at least two different air interfaces. As described above, increasing numbers of 5G NR wireless devices attached to the access node can overwhelm the bandwidth of a mobile backhaul connection between the access node and core network elements. The threshold can include one of a plurality of thresholds.

Thus, at 520, the quantity of antenna elements may be incrementally reduced as the usage of the mobile backhaul link rises to meet each of the plurality of thresholds. Reducing the quantity of antenna elements comprises configuring a portion of the plurality of antenna elements to deploy only one wireless air interface instead of two wireless air interfaces. For example, when the at least two wireless air interfaces comprise a 4G long-term evolution (LTE) wireless air interface and a 5G new radio (NR) wireless air interface, the portion of the plurality of antenna elements may be configured to deploy only the 4G wireless air interface. Further, the reduction may be incremental based on which threshold is exceeded by the bandwidth. Such incremental reductions are illustrated below with respect to FIGS. 6A-6C.

Figure 6A:
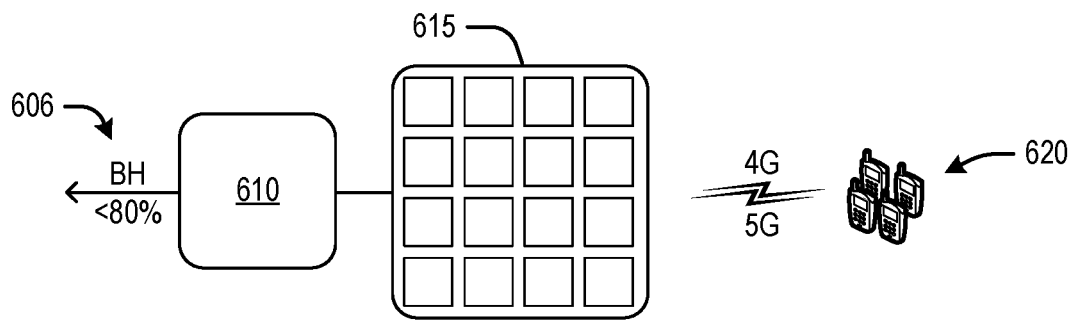
FIGS. 6A-6C depict exemplary reductions of antenna elements deploying multiple radio air interfaces based on a bandwidth of a backhaul exceeding different thresholds.
Figure 6B:
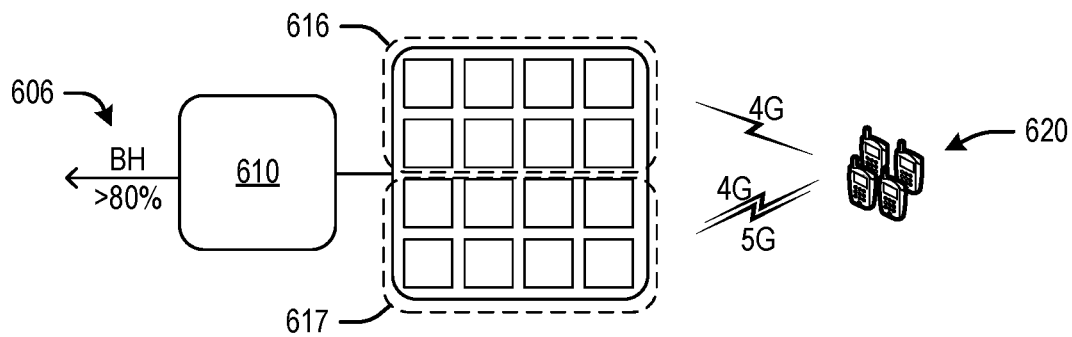
Figure 6C:
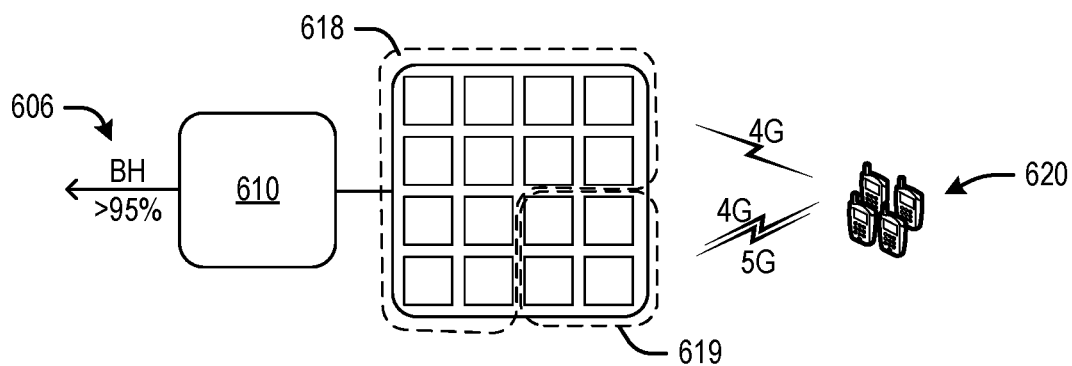

FIGS. 6A-6C illustrate exemplary incremental reductions of antenna elements operating in concurrent mode. In this exemplary embodiment, access node 610 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, access node 610 can comprise an antenna array 615 comprising a plurality of antenna elements, with each antenna element of antenna array 615 being configured to communicate using both interfaces at the same time in what is referred to as "concurrent mode". For example, antenna elements coupled to access node 610 can be configured to simultaneously communicate using 4G LTE and 5G NR.

Further, as described herein, increasing numbers of 5G NR wireless devices among wireless devices 620 can cause increased load on a mobile backhaul connection 606 between access node 610 and core network elements (not shown herein). Thus access node 610 (or a processing node communicably coupled thereto) is configured to perform operations comprising monitoring a usage of a mobile backhaul link 606 and, based on the usage, adjusting a quantity of antenna elements in antenna array 615 that are configured to concurrently deploy the 4G LTE and 5G NR wireless air interfaces. Upon determining that the usage of the mobile backhaul link 606 exceeds a threshold, the quantity of antenna elements that are configured to concurrently deploy both wireless air interfaces is reduced. Further, the threshold can include one of a plurality of thresholds, and the quantity of antenna elements may be incrementally reduced as the usage of the mobile backhaul link 606 rises to meet each of the plurality of thresholds.

With reference to FIG. 6A, all antenna elements within antenna array 615 are illustrated as being used to communicate with wireless devices 620 using both 4G LTE and 5G NR. Further, a percentage utilization of the bandwidth of mobile backhaul 606 is below 80%. With reference to FIG. 6B, the percentage utilization is shown as exceeding 80%. In this embodiment, 80% is an exemplary threshold bandwidth usage, and may be configurable depending on the needs of a network operator. In this instance, a portion 616 of antenna elements is configured to deploy only the 4G wireless air interface, while the portion 617 of antenna elements continues to deploy both 4G and 5G wireless air interfaces. This can reduce the usage of mobile backhaul 606—however, in the instance, that the usage continues to rise, then additional incremental adjustments may be performed. For example, with reference to FIG. 6C, the percentage utilization is shown as exceeding 95%. In this embodiment, 95% is another exemplary threshold bandwidth usage, and may be configurable depending on the needs of a network operator. In this instance, a larger portion 618 of antenna elements is configured to deploy only the 4G wireless air interface, while a smaller portion 619 of antenna elements continues to deploy both 4G and 5G wireless air interfaces.

Additional combinations and permutations of reductions may be envisioned by those having ordinary skill in the art in light of this disclosure. For example, smaller incremental reductions may be performed in response to incremental increases in mobile backhaul usage, such as reducing 10% of concurrently-operating antenna elements response to determining a 10% increase in usage, and so on. Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology. So long as the described reductions in concurrently operating antenna elements is triggered by monitored increases in the backhaul usage, the specific implementation and network topology is less relevant.

In future examples, more than two carriers or wireless air interfaces can be deployed in a concurrent operating mode, such as 3 or more carriers. In such examples, the reduction of concurrently-operating antenna elements may also include incremental reductions in the number of carriers deployed by each antenna element. For example, as a mobile backhaul usage increases, each antenna element may be configured to concurrently deploy 2 wireless air interface rather than 3 wireless air interfaces.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for preserving bandwidth of a mobile backhaul link of an access node comprising a plurality of antenna elements, the method comprising:
monitoring a usage of the mobile backhaul link;
determining that the usage of the mobile backhaul link meets one of a plurality of thresholds; and
based on the usage of the mobile backhaul link, incrementally reducing a quantity of antenna elements of the plurality of antenna elements that are configured to concurrently deploy a first wireless air interface using a first radio access technology (RAT) and a second wireless air interface using a second RAT as usage of the mobile backhaul link rises to meet each of the plurality of thresholds.

2. The method of claim 1, wherein:
the quantity of antenna elements that are configured to concurrently deploy the first wireless air interface using the first RAT and the second wireless air interface using the second RAT comprises 64, and
incrementally reducing the quantity of antenna elements comprises reducing the quantity to 32.

3. The method of claim 1, wherein:
the quantity of antenna elements that are configured to concurrently deploy the first wireless air interface using the first RAT and the second wireless air interface using the second RAT comprises 128, and
incrementally reducing the quantity of antenna elements comprises reducing the quantity to 64.

4. The method of claim 1, wherein:
the quantity of antenna elements that are configured to concurrently deploy the first wireless air interface using the first RAT and the second wireless air interface using the second RAT comprises 64, and
incrementally reducing the quantity of antenna elements comprises reducing the quantity to 16.

5. The method of claim 1, wherein incrementally reducing the quantity of antenna elements comprises configuring a portion of the plurality of antenna elements to deploy only the first wireless air interface based on the first RAT.

6. The method of claim 5, wherein the first wireless air interface comprises a 4G long-term evolution (LTE) wireless air interface and the second wireless air interface comprises a 5G new radio (NR) wireless air interface.

7. The method of claim 6, further comprising configuring the portion of the plurality of antenna elements to deploy only the 4G wireless air interface.

8. The method of claim 6, further comprising determining that a load of the 5G wireless air interface meets a threshold prior to incrementally reducing the quantity of antenna elements.

9. A system for preserving bandwidth of a mobile backhaul, the system comprising:
an access node comprising a plurality of antenna elements, each antenna element being configured to concurrently deploy a first wireless air interface based on a first radio access technology (RAT) and a second wireless air interface based on a second radio access technology (RAT); and
a processing node communicably coupled to the access node, the processing node configured to perform operations comprising:
determining that a usage of a mobile backhaul connection associated with the access node exceeds one of a plurality of thresholds; and
incrementally reducing a quantity of the plurality of antenna elements configured to deploy both of the first wireless air interface and the second wireless air interface as usage of the mobile backhaul connection rises to meet each of the plurality of thresholds.

10. The system of claim 9, wherein the first wireless air interface comprises a 4G long-term evolution (LTE) wireless air interface and the second wireless air interface comprises a 5G new radio (NR) wireless air interface.

11. The system of claim 10, wherein incrementally reducing the quantity of the plurality of antenna elements configured to deploy both of the first wireless air interface and the second wireless air interface comprises configuring another quantity of the plurality of antenna elements to deploy only the first wireless air interface.

12. The system of claim 9, wherein incrementally reducing a quantity of the plurality of antenna elements configured to deploy both of the first wireless air interface and the second wireless air interface comprises configuring incrementally larger portions of the plurality of antenna elements to deploy only one wireless air interface of the first wireless air interface and the second wireless air interface.

13. The system of claim 9, wherein the access node comprises 64 antenna elements configured to deploy the at least two wireless air interfaces, and incrementally reducing the quantity of the plurality of antenna elements configured to deploy both of the first wireless air interface and the second wireless air interface comprises configuring 32 antenna elements to deploy only one wireless air interface of the first wireless air interface and the second wireless air interface.

14. A processing node for preserving bandwidth of a mobile backhaul, the processing node operably coupled to a plurality of antenna elements and being configured to perform operations comprising:
monitoring a usage of a mobile backhaul link; and
based on the usage of the mobile backhaul link meeting one of a plurality of thresholds, incrementally reducing a quantity of antenna elements of the plurality of antenna elements that are configured to concurrently deploy a first wireless air interface using a first radio access technology (RAT) and a second wireless air interface using a second RAT as usage of the mobile backhaul link rises to meet each of the plurality of thresholds.

15. The processing node of claim 14, wherein incrementally reducing a quantity of antenna elements of the plurality of antenna elements that are configured to concurrently deploy the first wireless air interface and the second wireless air interface comprises configuring incrementally larger portions of the antenna elements to deploy only one of the first wireless air interface and the second wireless air interface.

16. The processing node of claim 14, wherein the first wireless air interface comprises a 4G long-term evolution (LTE) wireless air interface and the second wireless air interface comprises a 5G new radio (NR) wireless air interface.

* * * * *